March 20, 1962  R. C. CHRISTOPHERSEN  3,025,967
DISH DRYING RACK
Filed May 18, 1961  2 Sheets-Sheet 1
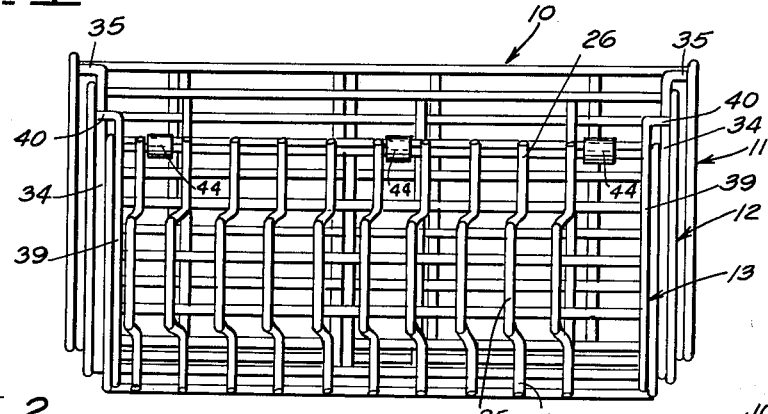
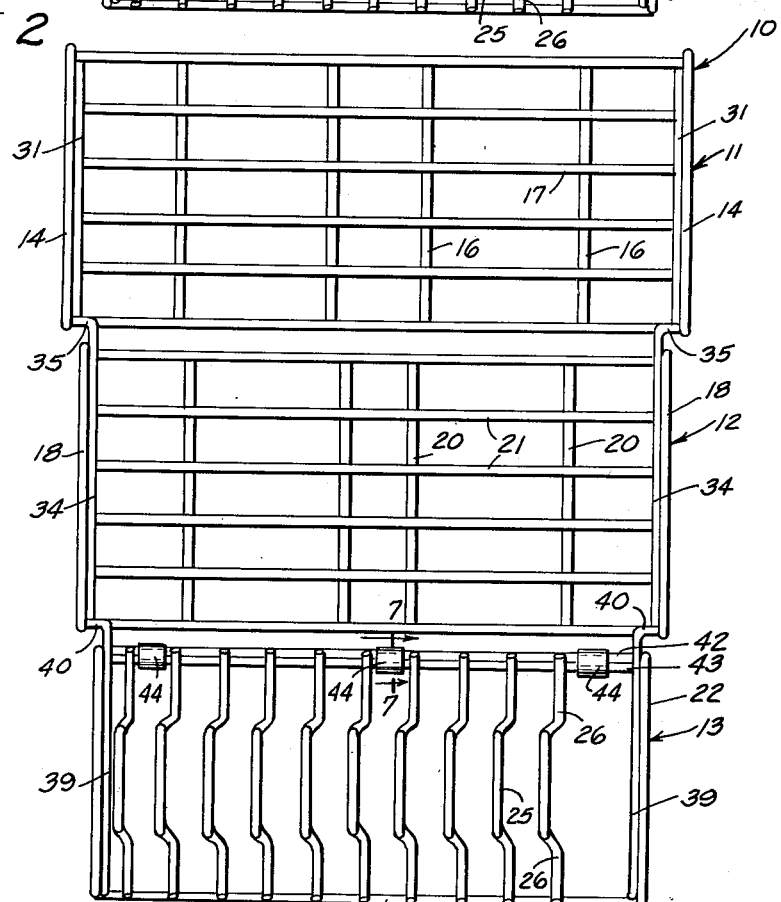
INVENTOR.
RALPH C. CHRISTOPHERSEN
BY
Charles B. Cannon
His Att'y March 20, 1962 R. C. CHRISTOPHERSEN 3,025,967
DISH DRYING RACK
Filed May 18, 1961 2 Sheets-Sheet 2
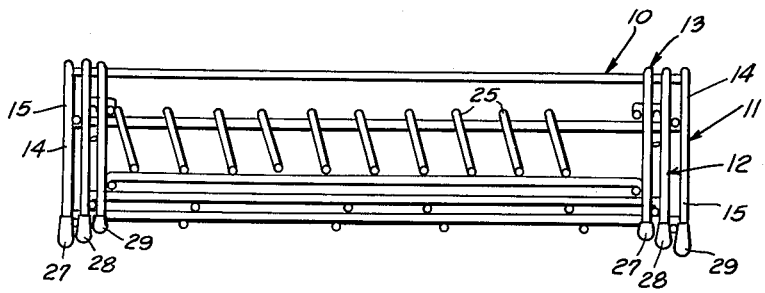
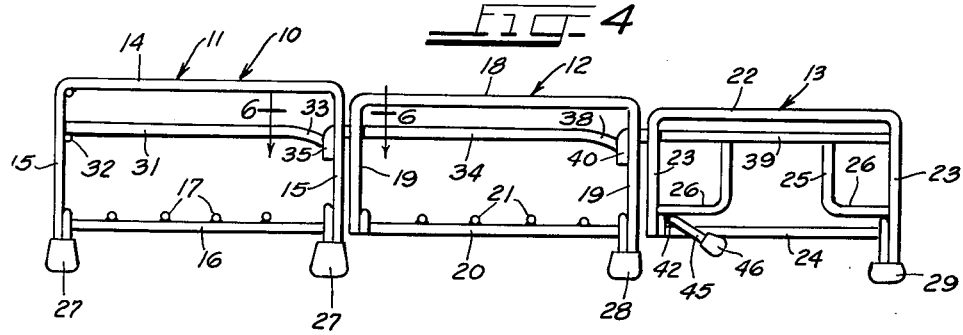
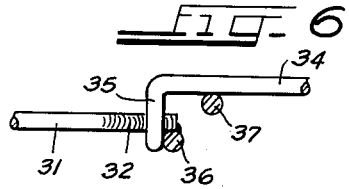
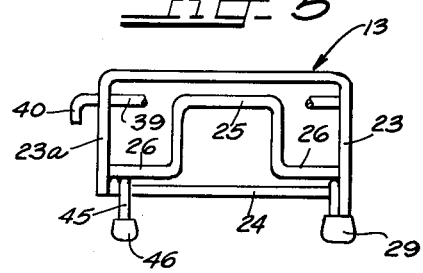
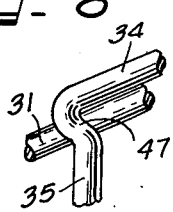
INVENTOR.
RALPH C. CHRISTOPHERSEN
BY
Charles B. Cannon
His Atty.

United States Patent Office 3,025,967
Patented Mar. 20, 1962

3,025,967
DISH DRYING RACK
Ralph C. Christophersen, 27 172nd St., Hammond, Ind.
Filed May 18, 1961, Ser. No. 110,946
9 Claims. (Cl. 211—41)

This invention relates to a dish draining and drying rack unit adapted to be used in the sink opening of a kitchen sink in residences, restaurants, and like places.

An object of the invention is to provide a new and improved dish draining and drying rack which is relatively simple and inexpensive in construction and convenient to use and which affords much greater capacity for drying of dishes than is afforded by prior dish racks now available.

Another object of the invention is to provide a new and improved dish draining and drying rack which, when not in use, may be stored in a minimum amount of space.

A further object of the invention is to provide a new and improved dish draining and drying rack embodying a plurality of dish rack sections which have greater versatility in use than prior art dish racks and which are adapted to be engaged with each other but extended in such a manner that they provide adequate space for washing and drying dishes when used in a kitchen sink, or like places, but may be telescopically collapsed into nested position so that they will occupy a minimum of space for storage purposes when not in use.

An additional object of the invention is to provide in the new dish rack unit novel means for telescopically interconnecting the sections of the dish rack so that they may be telescopically nested together for storage purposes.

Other and further objects of the present invention will be apparent from the following description and claims and are illustrated in the accompanying drawings, which by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention.

In the drawings:

FIG. 1 is a top plan view showing the new dish rack unit with the sections thereof telescopically nested together for storage;

FIG. 2 is a top plan view showing the sections of the new dish rack in extended position of use;

FIG. 3 is a side elevational view, as seen from the bottom in FIG. 1, showing the sections of the new dish rack unit nested telescopically together in position for storage;

FIG. 4 is a side elevational view as seen from the left in FIG. 2;

FIG. 5 is a fragmentary end elevational view showing the smallest section of the new dish rack unit, per se;

FIG. 6 is a fragmentary detail view, partly in section, on line 6—6 in FIG. 4 showing a part of the means embodied in the new dish rack unit for telescopically interconnecting the sections together;

FIG. 7 is a transverse sectional detail view on line 7—7 in FIG. 1; and

FIG. 8 is a fragmentary perspective view of the means illustrated in FIG. 6 for telescopically interconnecting the sections of the new dish rack unit together.

A preferred embodiment of the new dish rack unit is illustrated in the drawings, where it is generally indicated at 10, and is shown as including three dish rack sections 11, 12 and 13. The dish rack section 11 is shown as being the largest of the three dish rack sections and includes U-shaped end frame members 14 having depending legs 15 to which there may be attached, in any suitable manner, as by welding, transverse frame members 16, which, in turn, have longitudinally extending frame members 17 extending thereacross and secured thereto in any suitable manner, as by welding. Thus, it will be noted that the transverse frame members 16 and the longitudinal frame members 17 provide an open mesh support adjacent the bottom of the section, for dishes, glasses, cups, etc., which may be arranged thereon for spraying, washing or drying.

Similarly, the intermediate dish rack section 12, which is shown as being smaller in overall dimensions than the dish rack sections 11, but larger than the dish rack section 13, includes end frame members 18 having depending legs 19, and transverse frame members 20 secured to the end frame members 18, and longitudinally extending frame members 21 arranged upon the transverse frame members 20, the parts 19—20 and 20—21 being secured together in any suitable manner, as by welding, to provide an open mesh support adjacent the bottom of the section, for dishes, cups, etc.

Likewise, the end section 13, which is shown as being the smallest of the three sections in overall dimensions or area, includes U-shaped end frame members 22 each having rigid depending supporting legs 23 and 23a at the ends thereof, and transverse frame members 24 are secured to the end frame member 23 (FIGS. 4 and 5). A longitudinal side frame member 30 is secured to and extends between the end frame members 23 at one side of the dish rack unit 13 (FIG. 2) and a longitudinal side frame member 42 is secured to and extends between the end frame members 23 at the opposite side thereof (FIG. 2). Generally U-shaped dish separator and supporting members 25, having rigid legs 26, extend between the longitudinally extending frame members 30 and 42 of the dish rack section 11 and are secured thereto in any suitable manner, as by welding.

In addition, a longitudinally extending leg support 43 extends parallel to and alongside the longitudinal side frame member 42 and is held in position by clips 44 which encircle the members 42—43 at intervals therealong (FIGS. 2 and 7).

Suitable supporting feet, in the form of rubber suction cups 27, or the like, may be mounted on the supporting legs 15 of the dish rack section 11, similar supporting feet 28 may be mounted on one set of the supporting legs 19 of the end frame members 18 of the intermediate dish rack section 12, and similar supporting feet 29 may be mounted on the rigid outer supporting legs 23 of the U-shaped frame members 22 of the smallest dish rack section 13 (FIGS. 4 and 5).

The longitudinally extending leg supporting member 42 has depending legs 45 at each end thereof and each of these legs 45 has a supporting foot, such as a rubber cup 46 thereon (FIGS. 4 and 5).

The largest dish rack section 11 includes a pair of transversely extending guide track members 31 which extend across the section 11 and are secured to braces 32 which are in turn connected to the outer supporting legs 15, each of these guide tracks 31 having a downwardly inclined end portion 33, as shown in FIGS. 4 and 6.

Similarly, the intermediate dish rack section 18 has a pair of guide track members 34 suitably secured to the frame work thereof and each of these guide track members 34 has a downwardly inclined end portion 38 at one end thereof (FIG. 4). In addition, each of the guide track members 34 has a laterally or horizontally offset portion 47 which terminates in a downwardly extending end portion 35 (FIGS. 4 and 8) and each of these offset and downwardly angled end portions 47—35 is adapted to ride upon a corresponding one of the guide track members 31 of the dish rack section 11. Similarly, each of the guide track members 39 in the intermediate dish rack section 13 has a laterally offset and downwardly angled end portions 40, corresponding to the laterally offset and downwardly angled end portions 47—35 of each of the guide track members 34 (FIG. 8) and these offset and downwardly angled end portions 40 are adapted to slide on the guide track members 34 of the intermediate dish rack section 12 (FIG. 4).

In the use of the new dish draining and drying rack the parts may be arranged in extended position, as shown in FIG. 2, and when so disposed dishes may be arranged upon the open mesh support 16—17 and 20—21 of the sections 11 and 12 for washing, spraying and drying, etc. When the dish rack sections 11, 12 and 13 are so disposed they are held in a unitary assembled relationship by engagement of the laterally offset and downwardly angled end portions 47—35 of the guide track members 34 of the intermediate dish rack section 12 with the vertical legs 15 of the U-shaped end frame members 14 of the dish rack section 11, and by engagement of the laterally offset and downwardly angled end portions 40 of the guide track members 39 of the smallest dish rack section with the vertical legs 19 of the U-shaped end frame members 18 of the intermediate dish rack section 12.

However, when it is desired to assemble the three dish rack sections 11, 12 and 13 into a unitary assembly for storage, the dish rack sections 11, 12 and 13 may be nested in telescopically nested formation, as in FIGS. 1 and 3, by first manipulating the smallest dish rack section 13 so that the laterally offset angled end portions 40 of the guide track members 39 of the dish rack section 13 will ride up and over the downwardly inclined end portions 38 of the guide track members 34 of the intermediate dish rack section 12 so as to nest the smallest dish rack section 13 within the overall area of the intermediate dish rack section 12. The two thus assembled dish rack sections 12 and 13 may then be manipulated, as a unit, to move the laterally offset and downwardly angled end portions 35 of the guide track members 34 of the intermediate dish rack section 12 over the downwardly inclined end portions 33 of the guide track members 31 of the dish rack section 11, whereupon the two dish rack sections 12 and 13 may be nested together with the dish rack section 11 and the entire assembly thus telescopically nested together in the position in which the parts are shown in FIGS. 1 and 3 so as to occupy a minimum of space for storage purposes.

When it is desired to use the new dish rack unit 11—12—13 this may be accomplished by manually sliding the assembled sections 12 and 13 away from the larger section 11 so as to move the laterally offset and downwardly angled end portions 47—35 of the intermediate dish rack section 12 along the guide track members 31 and down the angled end portions 33 of the latter into engagement with the vertical legs 15 of the end frame members 14 of the dish rack section 11, and then moving the smallest section 13, relative to the intermediate section 12, by sliding the offset and downwardly angled end portions 40 thereof along the guide track members 34 and down the angled end portions 38 thereof until the offset and angled end portions 40 of the guide track members 39 on the section 13 engage the vertical legs 19 of the U-shaped end frame members 18 of the intermediate section 12.

When the smallest section 13 is in extended position, but assembled with the sections 11 and 12, as in FIG. 4, it may be supported entirely by the supporting legs 23 and feet 29. However, when it is desired to use the smallest section 12 alone or separately, as in FIG. 5, so as to dry or spray dishes supported thereon between the central upright parts 25 of the dish supporting members 25—26, this may be accomplished by lifting the section 13 upwardly so as to clear the offset angled end portions 40 thereof from the intermediate section 12 and then pivoting the rod 43 and its supporting legs 45—46 into position, as in FIG. 5, so that the dish rack section 13 will be supported by the rigid legs 23—29 and by the movable legs 45—46. However, when the dish rack section 13 is to be used in assembled relationship with the sections 11 and 12, the supporting feet 45—46 thereon may be swung upwardly into the position shown in FIG. 4, by rotating the rod 43 in the sleeves 44.

It will also be noted that in the use of the new dish draining and drying rack, the section 13 affords a means for placing dishes, etc., in position to be dried while leaving the other two sections 11 and 12 free for drying glasses, cups, etc., as distinguished from prior art dish draining and drying racks in which the raised dish-separating and supporting units 25—26 in the section 13 are arranged centrally in a single dish draining and drying unit with the result that only a limited area at the sides thereof is available for drying glasses, cups, etc., whereas in the present invention, the entire area of the sections 11 and 12 is available for this purpose.

It will thus be seen from the foregoing description, considered in conjunction with the accompanying drawings, that the present invention provides a new and improved and relatively simple and inexpensive dish rack unit having the desirable advantages and characteristics and accomplishing its intended objects, including those hereinbefore pointed out and those which are inherent in the invention.

I claim:

1. A dish rack unit comprising a plurality of dish rack sections each including a generally rectangular-shaped supporting frame including end frame members and side frame members, longitudinally extending frame members extending between and secured to the said end frame members, and transversely extending frame members extending between and secured to the said longitudinally extending frame members, said longitudinally extending frame members and said transversely extending frame members cooperating to provide an open mesh support for dishes and the like, at least one of said dish rack sections having a pair of guide track members extending transversely thereacross adjacent the sides thereof, and coacting means on at least one other of said dish rack sections engageable with and adapted to ride upon said guide track members for guiding said second-named dish rack section into nested relation with said first-named dish rack section.

2. A dish rack unit as defined in claim 1 in which each of the said guide track members has a downwardly extending end portion at one end thereof, and in which the said coacting means on the said second-named dish rack section is adapted to engage the said downwardly angled end portion of one of said guide track members and to ride up the same onto one of said guide track members.

3. A dish rack unit as defined in claim 1 and in which each of the said guide track members extends transversely thereacross at each end, and in which said second-named dish rack section has a guide track member at each side thereof, and in which the said coacting means is in the form of a laterally offset and downwardly angled end portion on each of the said guide track members of said second-named dish rack section engageable with and adapted to ride up and onto one of the said guide track members of said first-named dish rack section.

4. A dish rack unit as defined in claim 1 and in which each of the said guide track members has a downwardly extending end portion at one end thereof, and in which said second-named dish rack section has a pair of guide track members arranged one on each side thereof, and in which the said coacting means is in the form of a laterally offset and downwardly angled end portion on each of said second-named guide track members adapted to engage and ride up the said downwardly angled end portion of one of said guide track members of said first-named dish rack section and onto said guide track members of said first-named dish rack section to nest said dish rack sections together in nested telescopic relationship relative to each other.

5. A dish rack unit as defined in claim 1 and in which each of the said guide track members has a downwardly extending end portion at one end thereof, and in which said second-named dish rack section has a pair of guide track members arranged one on each side thereof, and in which the said coacting means is in the form of a laterally offset and downwardly angled end portion on each of said second-named guide track members adapted to engage and ride up the said downwardly angled end portion of one of said guide track members and said first-named dish rack section and onto said guide track members of said first-named dish rack section to nest said dish rack sections together in nested telescopic relationship relative to each other, and in which said dish rack assembly includes a third dish rack section which includes a pair of guide track members extending transversely thereacross one at each end thereof, and each having a laterally offset and downwardly angled end portion adapted to engage and ride upon one of the guide track members of said second-named dish rack section.

6. A dish rack assembly as defined in claim 1 and in which said coacting means is adapted to engage one of the end frame members of said first-named dish rack section to hold the said dish rack sections in assembled but extended relationship relative to each other.

7. A dish rack assembly as defined in claim 3 in which the said laterally offset and downwardly angled portions of the said guide track members of the said second dish rack section are adapted to engage the end frame members of said first-named dish rack section to latch the said dish rack sections in assembled but extended relationship relative to each other.

8. A dish rack assembly as defined in claim 5 in which the said laterally offset and downwardly angled end portions of said guide track members on said second-named and third-named dish rack sections are adapted to engage the end frame members of said first-named and second-named dish rack sections to hold said dish rack sections in assembled but extended position relative to each other.

9. A dish rack assembly as defined in claim 1 which includes a third dish rack section including track members disposed at the sides thereof and each having a laterally offset and downwardly angled end portion adapted to engage and ride upon one of the track members of said second-named dish rack section, and in which said offset angled portions of said track members of said third dish rack section are adapted to engage the end frame members of said second-named dish rack section to hold said dish rack sections in assembled but extended relationship relative to each other, and in which said third-named dish rack section comprises leg-supporting means including a hingedly mounted leg supporting member extending longitudinally thereacross at one side thereof and pivotally mounted thereon and having a pair of leg members thereon adapted to support one side of said third-named dish rack section in position of use.

References Cited in the file of this patent

UNITED STATES PATENTS

| | | |
|---|---|---|
| 1,682,654 | Andrews | Aug. 28, 1928 |
| 2,095,130 | Gates | Oct. 5, 1937 |
| 3,003,647 | Lockwood | Oct. 10, 1961 |